US009065761B2

(12) United States Patent
Munoz et al.

(10) Patent No.: US 9,065,761 B2
(45) Date of Patent: Jun. 23, 2015

(54) PACKET REASSEMBLY PROCESSING

(75) Inventors: Robert J. Munoz, Round Rock, TX (US); Mark A. Bordogna, Andover, MA (US)

(73) Assignee: Intel Corporation, Santa Clara, CA (US)

(*) Notice: Subject to any disclaimer, the term of this patent is extended or adjusted under 35 U.S.C. 154(b) by 320 days.

(21) Appl. No.: 13/189,822

(22) Filed: Jul. 25, 2011

(65) Prior Publication Data
US 2013/0028264 A1 Jan. 31, 2013

(51) Int. Cl.
*H04L 12/951* (2013.01)
*H04L 12/851* (2013.01)
H04L 12/70 (2013.01)
H04L 12/861 (2013.01)
H04L 29/06 (2006.01)

(52) U.S. Cl.
CPC ..... *H04L 47/2483* (2013.01); *H04L 2012/5656* (2013.01); *H04L 2012/5661* (2013.01); *H04L 49/9057* (2013.01); *H04L 29/06993* (2013.01)

(58) Field of Classification Search
None
See application file for complete search history.

(56) References Cited

U.S. PATENT DOCUMENTS

| 4,622,631 | A | 11/1986 | Frank et al. |
|---|---|---|---|
| 5,623,698 | A | 4/1997 | Stephenson et al. |
| 5,892,766 | A | 4/1999 | Wicki et al. |
| 5,943,283 | A | 8/1999 | Wong et al. |
| 6,038,630 | A | 3/2000 | Foster et al. |
| 6,195,335 | B1 | 2/2001 | Calvignac et al. |
| 6,567,564 | B1 | 5/2003 | van der Wal |
| 6,636,932 | B1 | 10/2003 | Regev et al. |
| 7,089,346 | B2 | 8/2006 | Cebulla et al. |
| 7,120,153 | B1 * | 10/2006 | Anconetani et al. ....... 370/395.4 |
| 7,234,018 | B1 | 6/2007 | Purcell et al. |
| 7,461,208 | B1 | 12/2008 | Caprioli et al. |
| 7,596,142 | B1 | 9/2009 | MacAdam |
| 2002/0029214 | A1 | 3/2002 | Yianilos et al. |
| 2002/0165985 | A1 | 11/2002 | Chen et al. |
| 2003/0033276 | A1 | 2/2003 | Cheng et al. |
| 2003/0120664 | A1 * | 6/2003 | Davidson et al. ............ 707/100 |
| 2003/0123468 | A1 | 7/2003 | Nong |
| 2004/0131013 | A1 * | 7/2004 | Ise et al. ........................ 370/229 |
| 2004/0255209 | A1 | 12/2004 | Gross |
| 2005/0027920 | A1 | 2/2005 | Fitzsimmons et al. |
| 2005/0152352 | A1 | 7/2005 | Jun et al. |
| 2006/0256783 | A1 | 11/2006 | Ayrapetian et al. |
| 2007/0016756 | A1 | 1/2007 | Hsieh et al. |
| 2007/0226798 | A1 | 9/2007 | Sibert |
| 2008/0162793 | A1 | 7/2008 | Chu et al. |
| 2010/0260198 | A1 | 10/2010 | Rojas-Cessa et al. |

FOREIGN PATENT DOCUMENTS

JP    H02-271444    11/1990

\* cited by examiner

*Primary Examiner* — Brandon Renner
*Assistant Examiner* — Scott M Sciacca
(74) *Attorney, Agent, or Firm* — Douglas A. Dallmann

(57) ABSTRACT

Described embodiments provide for a reassembly system for processing an asynchronous transfer mode (ATM) cell of data into an ATM adaptation layer (AAL) packet. A preprocessor module identifies a first conversation identification of one or more minipackets in the ATM cell, and reassembles the one or more minipackets having the first conversation identification into a portion of the AAL packet. A preprocessor determines if a trigger has occurred. In response to a trigger, the preprocessor sends a portion of the reassembled minipackets having the first conversation identification to a destination processor.

11 Claims, 3 Drawing Sheets

100

US 9,065,761 B2

PACKET REASSEMBLY PROCESSING

BACKGROUND OF THE INVENTION

1. Field of the Invention

The present invention relates to communication systems, in particular, to asynchronous transfer mode processing of packets.

2. Description of the Related Art

Asynchronous transfer mode (ATM) is a switching technique for telecommunications networks, and is commonly used for virtual private networks (VPNs). ATM establishes a virtual circuit (VC) between two endpoints before beginning data exchange and uses asynchronous time division multiplexing. ATM encodes data into short, fixed length packets referred to as cells. An ATM cell comprises a 5 byte header which is used by a network to deliver a cell to its destination, and a 48 byte payload which may represent part of voice, video, or data transmission. The cell header also comprises a Virtual Path Identifier (VPI) and a Virtual Channel Identifier (VCI). The VPI and the VCI identify the VC used by a connection. As cells traverse an ATM network, switching takes place by changing the VPI/VCI values.

The upper layer of the ATM is the ATM Adaptation Layer (AAL). The AAL supports upper layer information transfer protocols that are not based on ATM. The AAL defines how to segment and reassemble higher-layer packets into ATM cells, and how to handle various transmission aspects in the ATM layer. Services requiring adaptation include Gigabit Ethernet, Internet Protocol (IP), and UMTS/Wireless. The International Telecommunications Union (ITU) has defined several AAL protocols to meet a variety of needs. The AALs are classified into types based on whether a timing relationship must be maintained between source and destination, whether the application requires a constant bit rate, and whether the transfer is connection-oriented or connectionless. For example, AAL Type 2 (AAL2) supports time-dependent Variable Bit Rate (VBR-RT) of connection-oriented, synchronous traffic, such as voice over ATM. AAL Type 5 (AAL5) is commonly used in data traffic, such as IP. Details on AAL2 segmentation and reassembly are described in "ITU Telecommunication Standardization Sector (ITU-T) Recommendation 1.366.1; Segmentation and Reassembly Service Specific Convergence Sublayer for the AAL Type 2", hereinafter referred to as "ITU-T I.366.1".

In general, segmentation and reassembly refers to fragmenting and reassembling variable length packets into fixed length cells in order to transport them across ATM networks. The segmentation process differs according to the AAL type, but generally AAL traffic superimposes multiple minipacket "conversations" in ATM cells (e.g., 53 byte ATM packets) so that ATM cells include interleaved AAL minipackets. Nearly every packet from other protocols must undergo segmentation so that it complies with an ATM payload of 48 bytes. Packets are generally reassembled at their destination so that the original packet is reconstituted. Processing interleaved AAL traffic consumes many resources of the destination processor, and some types of packet reassembly are particularly demanding, limiting overall throughput of a network. For example, each AAL conversation often requires its own reassembly queue within the destination processor to reassemble and reorder the AAL minipackets.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a preprocessing system for processing an asynchronous transfer mode (ATM) cell of data into an ATM adaptation layer (AAL) packet. A preprocessor module identifies a first conversation identification of one or more minipackets in the ATM cell, and reassembles the one or more minipackets having the first conversation identification into a portion of the AAL packet. A preprocessor determines if a trigger has occurred. In response to a trigger, the preprocessor sends a portion of the reassembled minipackets having the first conversation identification to a destination processor. For example, the trigger might be generated because a timer expires or because a second conversation identification is identified. The trigger might also be generated because the minipacket is identified as the last minipacket having the first conversation identification.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, increase of throughput might occur by preprocessing, such as at least starting to deinterleave, reassemble, and order minipackets, before sending minipackets to a destination processor. For example, a single (or otherwise small number) of queues might be used to begin reassembly and reordering of AAL traffic before sending the AAL traffic to the destination processor. In bursty traffic, for example, multiple AAL minipackets might be received for a single conversation before a minipacket is received for a subsequent conversation. When a subsequent conversation is received, the preprocessing might suspend reassembly of the prior conversation, supply the prior conversation "chunk" to the destination processor, and start "chunking" the subsequent conversation. Scaling allows for more than one chunking operation at a time to preprocess the AAL traffic. Also, other events might trigger the preprocessing to send the partially reassembled chunk to the destination processor.

Figure 1:
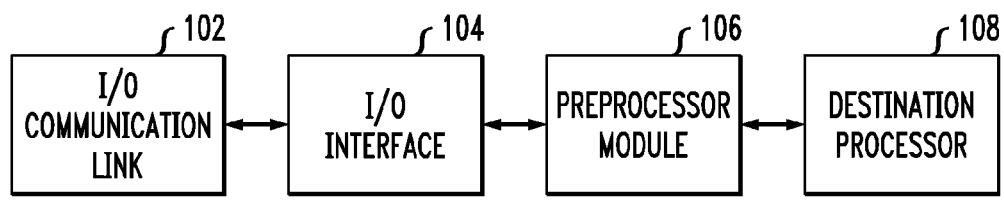
FIG. 1 shows a block diagram of a preprocessing system operating in accordance with exemplary embodiments of the present invention.

FIG. 1 shows a block diagram of preprocessing system 100 which comprises input/output (I/O) interface 104, preprocessor module 106, and destination processor 108. Destination processor 108 might process data packets, encrypt/decrypt data packets, or the like. Destination processor 108 might be implemented as a system-on-chip (SoC). Preprocessor module 106 is coupled to destination processor 108. Preprocessor module 106 might be implemented as a front-end device of destination processor 108 or as a multi-chip module, such as one or more field-programmable gate arrays (FPGAs). Preprocessor module 106 is coupled to one more I/O interfaces, collectively shown as I/O interface 104. I/O interface 104 might typically be implemented in hardware connecting preprocessor module 106 to one or more external devices, such as a computer system or a networking device, through I/O communication link 102. I/O communication link 102 might be a custom-designed communication link, or might conform to a standard communication protocol such as, for example, an Ethernet link, a synchronous digital hierarchy (SDH) link, an IEEE 802.11 link, a synchronous optical network (SONET) link, or any other interface link.

Figure 2:
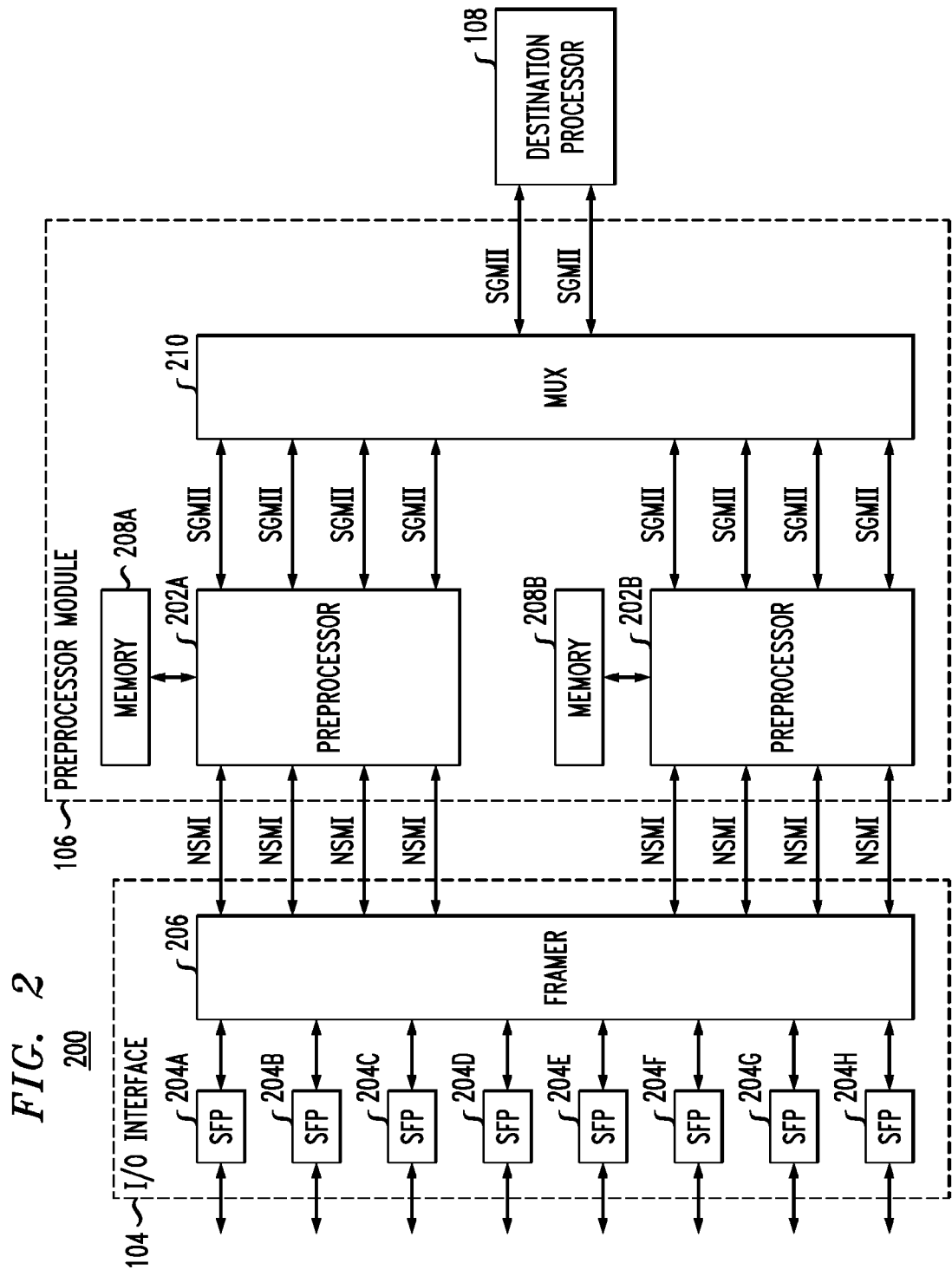
FIG. 2 shows a block diagram of an exemplary preprocessor module employed by the preprocessing system of FIG. 1.

FIG. 2 shows a block diagram of reassembly system 200, implementing preprocessor module 106 and I/O interface 104 in accordance with embodiments of the present invention. Preprocessor module 106 employs one or more preprocessors, shown as two exemplary preprocessors 202A and 202B. Preprocessors 202A and 202B might be implemented as multichip modules or as a system on chip (SoC), such as with an FPGA. In some embodiments of the present invention, reassembly system 200 performs AAL2 to Ethernet interworking. For example, eight bidirectional synchronous transport module level-1s (STM-1s) worth of traffic might be received at small form-factor pluggable (SFP) transceivers 204A-204H from I/O communication link 102. Although FIG. 2 shows eight SFP transceivers 204A-204H, the present invention is not so limited. SFP transceivers 204A-204H support other synchronous digital hierarchy (SDH) transmission standards in addition to STM-1, such as STM-4 and STM-16. Similarly, SFP transceivers 204A-204H might support other communication standards such as Gigabit Ethernet and Fibre Channel.

Framer 206 might receive STM-1 traffic and arrange the data in the basic transmission format for SDH (e.g., a frame) to allow for simultaneous transport of many different circuits of differing origin. The frames are transported to preprocessors 202A-202B via a serial interface such as network serial multiplexed interfaces (NSMIs). While FIG. 2 shows two front-end devices (preprocessors 202A and 202B) coupled to destination processor 108, the invention is not limited to two preprocessors. One skilled in the art might implement preprocessing with one preprocessor, or with three or more preprocessors. Further, each preprocessor 202 might comprise one or more FPGAs, wherein each FPGA is coupled to framer 206 and multiplexer 210. In some embodiments, all traffic destined for destination processor 108 is routed through preprocessor module 106. Preprocessors 202A and 202B might begin to deinterleave and reassemble AAL minipackets before sending partially or wholly reassembled minipackets to destination processor 108. Multiplexer 210, which might be implemented as an FPGA-based multiplexer, might multiplex multiple serial gigabit media independent interfaces (SGMIIs) coming from preprocessors 202A-202B into two, for example, SGMIIs coupled to destination processor 108.

Preprocessors 202A and 202B might also be coupled to memories 208A-208B. Each memory 208 might typically be implemented as a dynamic random-access memory (DRAM), such as a double-data-rate three (DDR-3) DRAM, for off-chip storage of data. In embodiments of the present invention, memory 208 is a conventional memory operating as a cache that might be allocated or subdivided. For example, memory 208 might include one or more flash memories that might be dynamically allocated to the various preprocessors 202.

Figure 3:
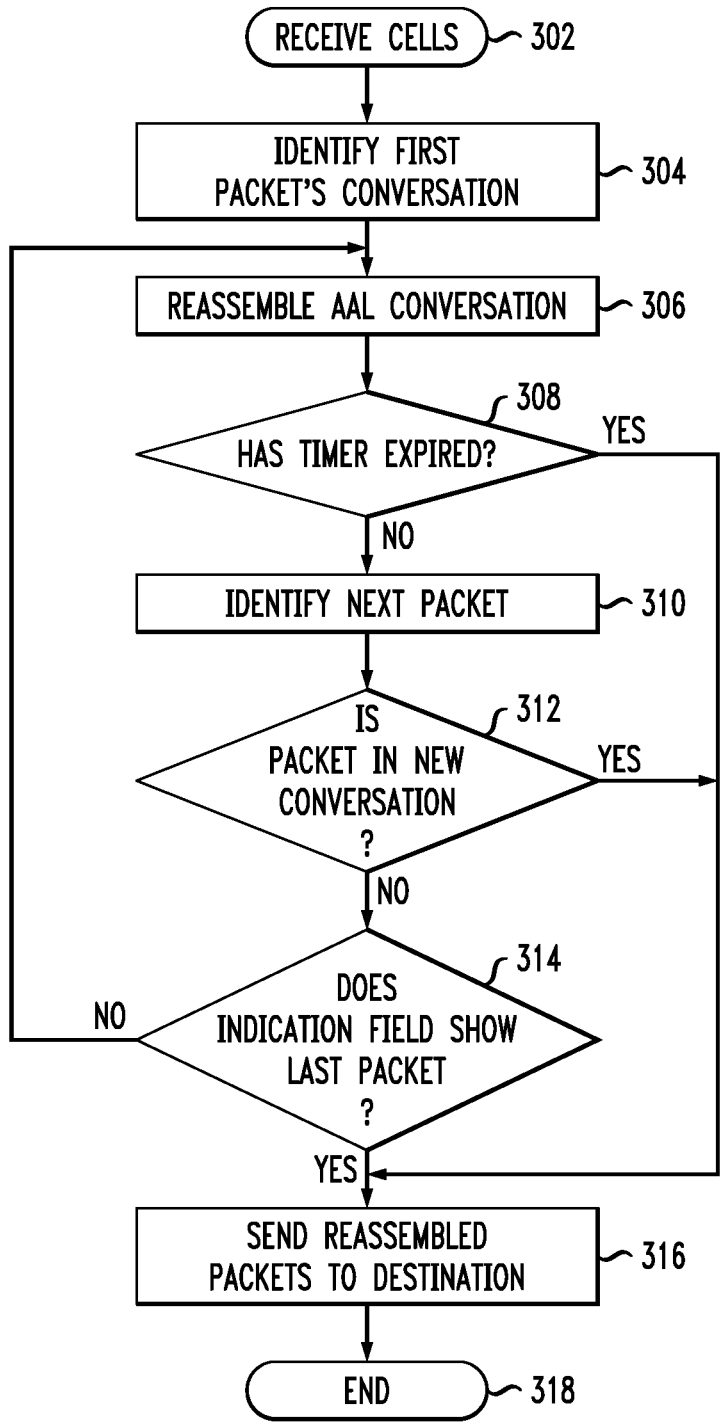
FIG. 3 shows a flow diagram of a process for packet reassembly processing in accordance with embodiments of the present invention.

Embodiments of the present invention share processing between preprocessor module 106 and destination processor 108. FIG. 3 shows a flow diagram of reassembly process 300 in accordance with embodiments of the present invention. Reassembly process 300 might be employed by preprocessor module 106 to perform a partial service specific segmentation and reassembly (SSSAR). For example, an ATM connection might include one or more ATM cells with corresponding minipackets that are closely grouped due to bursty transmissions (bursty transmission refers to transmissions with large packets). At step 302, preprocessing module 106 receives ATM cells. At step 304, the first packet's conversation (or connection) is identified. For example, an 8-bit connection identifier (CID) is used to identify individual AAL2 connections inside a single AAL2 link (e.g., ATM VCC set up for the transport of AAL2 traffic). A bundle comprising more than one multiplexed AAL2 connection is referred to as an N-CID. At step 306, the AAL conversation is reassembled, for example, by demultiplexing the N-CID cells into common part sublayer (CPS) packets and accumulating CPS packets that arrive on the same ATM virtual circuit (VC) for the same SSSAR conversation.

A test at step 308 determines if a timer has expired. If the timer has expired, the process proceeds to step 316 where preprocessor module 106 sends the partially reassembled packets to destination processor 108. A timer, for example, might protect against delays if the last CPS packet is dropped. If the timer has not expired, the process proceeds to step 310. A at step 310, the CID of the next packet is identified. A test at step 312 determines whether the current packet's conversation is the same as the previous packet's conversation. If both packets are in the same conversation, the process continues to step 314. At step 314, a test determines whether the packet contains an indication that the CPS packet is the last packet in the SSSAR. The indication might be in an indication field, and, like the CID, might be part of the overhead bytes of the CPS packet. For example, an AAL2 packet might provide an user-to-user indication (UUI) in its UUI field to communicate that the CPS packet is the last packet. If the packet's indication field shows that the packet is the last packet, preprocessor module 106 sends the reassembled packets to destination processor 108 at step 316. Similarly, if the test at step 312 determines that preprocessor module 106 has received a new conversation, the process continues to step 316 where the partially reassembled packets are sent to destination processor 108. If the test at step 314 determines that the packet is not the last packet in the SSSAR, the process returns to step 306 where reassembly of the AAL conversation resumes.

A preprocessor adapted to reassemble AAL packets in accordance with exemplary embodiments of the present invention provides for the following advantages. Processing performance is optimized by dividing processing between front-end devices and a back-end device. For example, the front-end devices might collectively have high processing performance but insufficient buffering memory and a back-end device might have sufficient buffering memory but insufficient processing performance, thereby maximizing efficient resource allocation.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing in hardware, including possible implementation as a single integrated circuit, a multi-chip module, a single card, or a multi-card circuit pack, the present invention is not so limited. As would be apparent to one skilled in the art, various functions of hardware may also be implemented in a software program. Such software may be implemented as steps performed by, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of processing an asynchronous transfer mode (ATM) cell of data into an ATM adaptation layer (AAL) packet, the method comprising:
    identifying a first connection identifier (CID) of one or more minipackets in the ATM cell based on a source address and a destination address of the one or more minipackets in the ATM cell;
    reassembling the one or more minipackets having the first CID into one or more common part sublayer (CPS) packets;
    reassembling the one or more CPS packets having the first CID into a portion of a service specific segmentation and reassembly (SSSAR) conversation;
    determining, by a preprocessor, an occurrence of a trigger by:
        identifying a second CID of one or more subsequent minipackets based on a source address and a destination address of the one or more subsequent minipackets; and
        determining whether the second CID differs from the first CID, and,
            if so, generating the trigger;
            if not, checking an indication field of the one or more minipackets; and
            determining, based on the indication field of a selected minipacket, whether the selected minipacket is a last minipacket having the first CID, and, if so, generating the trigger,
            wherein the indication field is a part of an overhead bytes of the selected minipackets;
    in response to determining the occurrence of the trigger, sending the portion of the reassembled minipackets having the first CID to a destination processor.

2. The method as recited in claim 1, wherein determining, by the preprocessor, the occurrence of the trigger further comprises:
    checking, by the preprocessor, a timer; and
    determining whether the timer expired, and, if so,
    generating the trigger.

3. The method of claim 1, wherein the preprocessor comprises one or more field-programmable gate arrays.

4. The method of claim 1, wherein the method is implemented as steps executed by a system-on-chip (SoC) network processor.

5. The method of claim 1, wherein the AAL packet is an AAL type 2 packet.

6. The method of claim 1, wherein the AAL packet is an AAL type 5 packet.

7. A reassembly system configured to process an asynchronous transfer mode (ATM) cell of data into an ATM adaptation layer (AAL) packet, the system comprising:
    one or more preprocessors, each coupled to a multiplexer, each preprocessor configured to:
        arrange synchronous transport module data traffic in one or more frames;
        identify a first connection identifier (CID) of one or more minipackets in the ATM cell based on a source address and a destination address of the one or more minipackets in the ATM cell;
        reassemble the one or more minipackets having the first CID into one or more common part sublayer (CPS) packets;
        reassemble the one or more CPS packets having the first CID into a portion of a service specific segmentation and reassembly (SSSAR) conversation;

identify a second CID of one or more subsequent minipackets based on a source address and a destination address of the one or more subsequent minipackets; and determine whether the second CID differs from the first CID, and, if so, generating the trigger;

if not, checking an indication field of the one or more minipackets; and determining, based on the indication field of a selected minipacket, whether the selected minipacket is a last minipacket having the first CID, and, if so, generating the trigger, wherein the indication field is a part of an overhead bytes of the selected minipackets;

determine an occurrence of the trigger;

in response to determining the occurrence of the trigger, send the portion of the reassembled minipackets having the first CID to a destination processor coupled to the multiplexer.

8. The system of claim 7, further comprising: a timer, wherein the one or more preprocessors are further configured to:

check the timer; and determine whether the timer expired, and, if so, generate the trigger.

9. A non-transitory, machine-readable storage medium, having encoded thereon program code, wherein, when the program code is executed by a machine, the machine implements a method for processing an asynchronous transfer mode (ATM) cell of data into an ATM adaptation layer (AAL) packet, the method comprising:

identifying a first connection identifier (CID) of one or more minipackets in the ATM cell based on a source address and a destination address of the one or more minipackets in the ATM cell;

reassembling the one or more minipackets having the first CID into one or more common part sublayer (CPS) packets;

reassembling the one or more CPS packets having the first CID into a portion of a service specific segmentation and reassembly (SSSAR) conversation;

determining, by a preprocessor, an occurrence of a trigger by:

identifying a second CID of one or more subsequent minipackets based on a source address and a destination address of the one or more subsequent minipackets; and determining whether the second CID differs from the first CID, and, if so, generating the trigger;

if not, checking an indication field of the one or more minipackets; and determining, based on the indication field of a selected minipacket, whether the selected minipacket is a last minipacket having the first CID, and, if so, generating the trigger, wherein the indication field is a part of an overhead bytes of the selected minipackets;

in response to determining the occurrence of the trigger, sending the portion of the reassembled minipackets having the first CID to a destination processor.

10. The non-transitory, machine-readable storage medium of claim 9, wherein determining the occurrence of the trigger further comprises:

checking a timer; and determining whether the timer expired, and, if so, generating the trigger.

11. The non-transitory, machine-readable storage medium of claim 9, wherein the AAL packet is an AAL type 2 packet.

* * * * *